(12) United States Patent
Tanaka et al.

(10) Patent No.: US 12,566,505 B2
(45) Date of Patent: Mar. 3, 2026

(54) INFORMATION NOTIFICATION SYSTEM, CONTROL DEVICE, AND CONTROL METHOD

(71) Applicant: Panasonic Automotive Systems Co., Ltd., Kanagawa (JP)

(72) Inventors: Tsuyoshi Tanaka, Kyoto (JP); Miori Kondo, Osaka (JP); Atsushi Masuda, Osaka (JP)

(73) Assignee: Panasonic Automotive Systems Co., Ltd., Kanagawa (JP)

( * ) Notice: Subject to any disclaimer, the term of this patent is extended or adjusted under 35 U.S.C. 154(b) by 0 days.

(21) Appl. No.: 18/958,933

(22) Filed: Nov. 25, 2024

(65) Prior Publication Data

US 2025/0190055 A1 Jun. 12, 2025

(30) Foreign Application Priority Data

Dec. 6, 2023 (JP) ................................. 2023-206331

(51) Int. Cl.
*G06F 3/01* (2006.01)
*B60Q 9/00* (2006.01)

(52) U.S. Cl.
CPC .............. G06F 3/016 (2013.01); G06F 3/013 (2013.01); *B60Q 9/00* (2013.01)

(58) Field of Classification Search
CPC . G06F 3/16; G06F 3/013; G06F 3/016; G06F 30/15; G06F 11/3013; G06F 11/0739; G06F 2203/014
See application file for complete search history.

(56) References Cited

U.S. PATENT DOCUMENTS

| | | | |
|---|---|---|---|
| 2009/0319095 A1 | 12/2009 | Cech et al. | |
| 2016/0097928 A1* | 4/2016 | Muramatsu | ............ B60K 35/80 |
| | | | 345/7 |
| 2018/0251066 A1* | 9/2018 | Murata | ................. B60W 30/12 |
| 2021/0197747 A1* | 7/2021 | Yoshizawa | ............... B60Q 3/80 |

FOREIGN PATENT DOCUMENTS

| | | |
|---|---|---|
| JP | 4342151 B2 | 10/2009 |
| WO | WO 2009155550 A1 | 12/2009 |

* cited by examiner

*Primary Examiner* — Matthew A Eason
*Assistant Examiner* — Scott D Au
(74) *Attorney, Agent, or Firm* — Seed Intellectual Property Law Group LLP

(57) ABSTRACT

An information notification system includes: an actuator that vibrates a body of a steering wheel for operating a movable body and is configured to output sound through vibration; a light emitter provided to the steering wheel and configured to emit light; and a control device that is electrically connected to the actuator and the light emitter, controls the actuator and the light emitter, and receives display information related to an indicator light displayed to an operator of the movable body. When receiving the display information, the control device causes the body to vibrate using the actuator and the light emitter to emit light, and subsequently outputs, using the actuator, sound related to the display information received.

11 Claims, 6 Drawing Sheets

INFORMATION NOTIFICATION SYSTEM, CONTROL DEVICE, AND CONTROL METHOD

CROSS REFERENCE TO RELATED APPLICATION

The present application is based on and claims priority of Japanese Patent Application No. 2023-206331 filed on Dec. 6, 2023.

FIELD

The present disclosure relates to an information notification system, a control device, and a control method.

BACKGROUND

Conventionally, a system for notifying an operator of various types of information for the operation of a movable body has been proposed. For example, Patent Literature (PTL) 1 discloses a system in which a display is provided on the steering wheel for a vehicle, which can notify the operator by displaying an image on such a display.

CITATION LIST

Patent Literature

PTL 1: International Publication No. WO2009/155550

SUMMARY

The conventional information notification system can be improved upon. In view of this, the present disclosure provides an information notification system and so on capable of improving upon the above related art.

An information notification system according to one aspect of the present disclosure includes: an actuator that vibrates a main body of a steering wheel for operating a movable body and is configured to output sound through vibration; a light emitter provided to the steering wheel and configured to emit light; and a control device that is electrically connected to the actuator and the light emitter, controls the actuator and the light emitter, and receives display information related to an indicator light displayed to an operator of the movable body. When receiving the display information, the control device causes the main body to vibrate using the actuator and the light emitter to emit light, and the control device subsequently outputs, using the actuator, sound related to the display information received.

Moreover, a control device according to one aspect of the present disclosure is a control device including: a first controller that causes a main body of a steering wheel for operating a movable body to vibrate, that is electrically connected to an actuator configured to output sound through vibration, and that controls the actuator; a second controller that is provided to the steering wheel, that is electrically connected to a light emitter configured to emit light, and that controls the light emitter; and a receiver that receives display information related to an indicator light displayed to an operator of the movable body. When receiving the display information, the control device causes the main body to vibrate using the actuator and the light emitter to emit light, and the control device subsequently outputs, using the actuator, sound related to the display information received.

Moreover, a control method according to one aspect of the present disclosure is a control method including: controlling, by a control device, an actuator that vibrates a main body of a steering wheel for operating a movable body, the actuator being configured to output sound through vibration, the control device being electrically connected to the actuator; controlling, by the control device, a light emitter provided to the steering wheel, the light emitter being configured to emit light, the control device being electrically connected to the light emitter; and receiving display information related to an indicator light displayed to an operator of the movable body. When the display information is received in the receiving, performing the controlling of the actuator to vibrate the main body and performing the controlling of the light emitter to cause the light emitter to emit light, and subsequently performing the controlling of the actuator to output sound related to the display information received.

The information notification system and so on according to one aspect of the present disclosure is capable of improving upon the above related art.

BRIEF DESCRIPTION OF DRAWINGS

These and other advantages and features of the present disclosure will become apparent from the following description thereof taken in conjunction with the accompanying drawings that illustrate a specific embodiment of the present disclosure.

Figure 1:
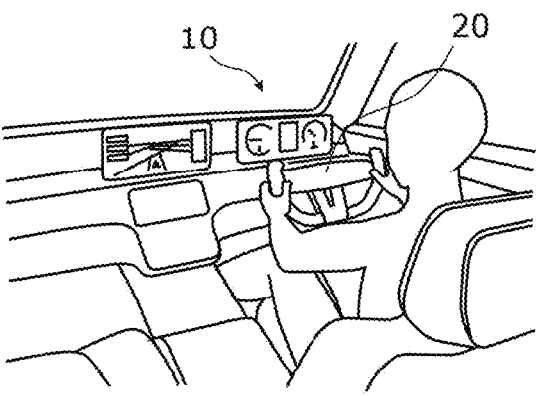
FIG. 1 is a schematic diagram illustrating an example of a movable body including an information notification system according to an embodiment.

DESCRIPTION OF EMBODIMENTS (Circumstances Leading to the Present Disclosure)

The inventors have found that the technique described in the "Background" section has the following issues. In a movable body, it is often necessary for the operator to see the destination of the movable body (for example, ahead of the vehicle), and there are often restrictions on the movement of the operator's line of sight. For this reason, the conventional system may not be able to provide appropriate notifications to the operator. For example, a vehicle, which is an example of a movable body, is driven by the driver as the operator, but the driver needs to see a point to which the vehicle is traveling (for example, ahead of the vehicle). This may restrict the movement of the driver's line of sight to a certain extent around the point to which the vehicle is traveling (for example, ahead of the vehicle). Even if a display is provided to the rim of the steering wheel, which is grasped by the driver during driving a vehicle, the following cases often occur. For example, the position of the display changes depending on the steering situation, and the steering angle of the steering wheel makes it difficult to see the rotating display, or the line of sight moves closer to the driver from the landscape ahead, thereby making it difficult to adjust the focus. Therefore, it may not be appropriate to notify the driver by displaying information on the display provided to the steering wheel.

On the other hand, when operating a movable body, it is necessary to know various information such as the situation around the movable body and the state of the movable body itself. Therefore, the movable body has a function to notify the operator by displaying the situation around the movable body and the state of the movable body itself as information. For example, information related to the situation around the movable body and the state of the movable body itself may be displayed on a display device as an indicator light or a warning light. However, such an indicator light and a warning light are often displayed in the form of icons and symbols that abstract their meanings, and the operator may not be able to understand the meaning instantly. Furthermore, because the region in which the indicator light is displayed is limited, the indicator light is small and difficult to notice. There, it is proposed to notify the operator that an indicator light is displayed together with its meaning using additional information.

As described above, it may not be appropriate to display additional information on the display provided to the steering wheel. In view of this, the present disclosure notifies the operator of additional information or measures to address the notification information by outputting sound. When sound is used, it is possible to perceive the sound by the sense of hearing even during operation of a movable body where the vision of the operator is restricted.

Moreover, in order to notify the operator that an indicator light or a warning light is displayed, sound also provides a trigger for the operator to easily notice the displayed indicator light or warning light. This trigger may be achieved by a combination of a tactile stimulus and a visual stimulus. However, the visual stimulus is not a stimulus that takes time to understand the contents, such as displaying the information itself in an image. The visual stimulus may be simply any stimulus as long as the presence or absence of the stimulus can be seen. The presence or absence of such a visual stimulus can be recognized by a visual function called peripheral vision by simply perceiving the visual stimulus inside the edges of the field of view without moving the line of sight. In addition, because a tactile stimulus is combined, the operator can be notified that the indicator light is displayed more effectively with the combination of visual and tactile stimuli. In this way, the so-called three-sensory stimulation of visual, tactile, and sound enables the operator to receive appropriate notifications related to an indicator light, a warning light, etc., and to address the contents of the notifications.

(Overview of Disclosure)

In view of the above, an information notification system according to a first aspect of the present disclosure includes: an actuator that vibrates a main body of a steering wheel for operating a movable body and is configured to output sound through vibration; a light emitter provided to the steering wheel and configured to emit light; and a control device that is electrically connected to the actuator and the light emitter, controls the actuator and the light emitter, and receives display information related to an indicator light displayed to an operator of the movable body. When receiving the display information, the control device causes the main body to vibrate using the actuator and the light emitter to emit light, and the control device subsequently outputs, using the actuator, sound related to the display information received.

Such an information notification system can make the operator aware of the presence of an indicator light by vibrating the main body of the steering wheel by the actuator and illumination from the steering wheel by the light emitter. After that, the operator can understand (and address) the situation meant by the indicator light from the sound regarding the display information related to the indicator light. Therefore, the operator can be appropriately notified of displaying of the indicator light.

In addition, the information notification system according to a second aspect is the information notification system according to the first aspect, and further includes: a camera that captures an image of the operator and outputs the image captured to the control device. When receiving the display information, the control device causes the main body to vibrate using the actuator and the light emitter to emit light, and subsequently, when determining that a line of sight of the operator in the image outputted is directed to an area in which the indicator light is displayed, the control device outputs, using the actuator, the sound related to the display information received.

In such an information notification system, the line of sight of the operator can be detected by the camera. After making the operator aware of the presence of an indicator light or warning light, the operator's line of sight is directed to the area in which the indicator light or warning light is displayed, and if the indicator light is regarded to have been seen by the operator, display information related to the indicator light or warning light, or sound related to a measure to address the notification information can be output.

Moreover, the information notification system for a third aspect is the information notification system according to the first aspect, and when receiving the display information, the control device causes the main body to vibrate using the actuator and the light emitter to emit light, and subsequently, when determining that a predetermined period has elapsed, the control device outputs, using the actuator, the sound related to the display information received.

In such an information notification system, after the operator is aware of the presence of an indicator light or warning light, it is possible to output display information related to the indicator light or sound related to a measure to address the notification information when a predetermined period of time has elapsed and it is regarded that sufficient time has elapsed for the indicator or warning light to be seen.

Moreover, an information notification system according to a fourth aspect is the information notification system according to any one of the first to third aspects, and the light emitter includes a first light emitter having a shape elongated in a first direction and configured to emit light from a plurality of points of the first light emitter arranged in the first direction, and the control device causes the first light emitter to emit light in a manner that simulates light movement in the first direction toward an area in which the indicator light is displayed.

Such an information notification system allows the operator to be notified of the area in which the indicator light or warning light is displayed by the light movement in the first direction.

Moreover, an information notification system according to a fifth aspect is the information notification system according to the fourth aspect, and the light emitter includes a second light emitter having a shape elongated in a second direction that intersects with the first direction and configured to emit light from a plurality of points of the second light emitter arranged in the second direction, and the control device causes the second light emitter to emit light in a manner that simulates light movement in the second direction toward the area in which the indicator light is displayed.

Such an information notification system can notify the operator of the area in which the indicator light or warning light is displayed by the light movement in the second direction.

Moreover, an information notification system according to a sixth aspect is the information notification system according to any one of the first to third aspects, and the light emitter includes a first light emitter having a shape elongated in a first direction and configured to emit light from a plurality of points of the first light emitter arranged in the first direction, and the control device causes the first light emitter to emit light in a manner that simulates light movement in a rotation direction of the steering wheel recommended based on the display information.

With such an information notification system, the operator can be notified of the recommended rotation direction of steering by the light movement in the first direction.

Moreover, an information notification system according to a seventh aspect is the information notification system according to any one of the fourth to sixth aspects, and the control device: determines a speed of the light movement; and causes the light emitter to emit light in the manner that simulates the light movement at the speed determined.

Such an information notification system can create variations of the visual stimulus based on the speed of the light movement. For example, different speeds of the light movement can be assigned to distances to the area in which the indicator light is displayed (for example, whether the indicator light is displayed on meter 17 or a side mirror) and recommended rotation speeds of the steering wheel inform the operator.

Moreover, an information notification system according to an eighth aspect is the information notification system according to any one of the first to seventh aspects, and the actuator is provided inside a support that supports the main body.

In such an information notification system, the actuator provided inside the support can provide a tactile stimulus to the operator.

Moreover, an information notification system according to a ninth aspect is the information notification system according to any one of the first to eighth aspects, and the actuator includes a plurality of vibrators, and among the plurality of vibrators, one or more vibrators are provided on one half of the steering wheel in a first direction and one or more vibrators are provided on an other half of the steering wheel in the first direction, and the control device causes the main body to vibrate using a vibrator, among the plurality of vibrators, that is closer to an area in which the indicator light has been displayed in the first direction.

In such an information notification system, vibration biased in the first direction can notify the operator of the area in which the indicator light is displayed (for example, whether the indicator light is displayed on meter 17 or a side mirror).

Moreover, an information notification system according to a tenth aspect is the information notification system according to any one of the first to ninth aspects, and the actuator includes a plurality of vibrators, and among the plurality of vibrators, one or more vibrators are provided on one half of the steering wheel in a first direction and one or more vibrators are provided on an other half of the steering wheel in the first direction, and the control device causes the main body to vibrate using a vibrator, among the plurality of vibrators, located closer to a leading end corresponding to a rotation direction of the steering wheel recommended based on the display information.

Such an information notification system can notify the operator of the recommended rotation direction of steering wheel by vibration biased in the first direction.

Moreover, a control device according to an eleventh aspect is a control device including: a first controller that causes a main body of a steering wheel for operating a movable body to vibrate, that is electrically connected to an actuator configured to output sound through vibration, and that controls the actuator; a second controller that is provided to the steering wheel, that is electrically connected to a light emitter configured to emit light, and that controls the light emitter; and a receiver that receives display information related to an indicator light displayed to an operator of the movable body. When receiving the display information, the control device causes the main body to vibrate using the actuator and the light emitter to emit light, and the control device subsequently outputs, using the actuator, sound related to the display information received.

Such a control device can provide the same effects as the information notification system described above.

Moreover, a control method according to a twelfth aspect is a control method including: controlling, by a control device, an actuator that vibrates a main body of a steering wheel for operating a movable body, the actuator being configured to output sound through vibration, the control device being electrically connected to the actuator; controlling, by the control device, a light emitter provided to the steering wheel, the light emitter being configured to emit light, the control device being electrically connected to the light emitter; and receiving display information related to an indicator light displayed to an operator of the movable body. When the display information is received in the receiving, performing the controlling of the actuator to vibrate the main body and performing the controlling of the light emitter to cause the light emitter to emit light, and subsequently performing the controlling of the actuator to output sound related to the display information received.

In such a control method can produce the same effects as the information notification system described above.

The following describes one or more embodiments of the present disclosure with reference to the drawings. Note that each of the one or more embodiments described below shows a general or specific example of the present disclosure. Therefore, the numerical values, structural elements, the arrangement and connection of the structural elements, steps and processing order of the steps, etc. mentioned in the following embodiment are mere examples and not intended to limit the present disclosure. Accordingly, among the structural elements in the following embodiment, structural elements not recited in any one of the independent claims of the present disclosure are described as optional structural elements.

In addition, each diagram is a schematic diagram and is not necessarily a precise illustration. Accordingly, the figures are not necessarily to scale. In each figure, configurations that are essentially the same share like reference signs. Accordingly, duplicate description is omitted or simplified.

Embodiment

[Configuration]

FIG. 1 is a schematic diagram illustrating an example of a movable body including an information notification system according to an embodiment. Here, an example of a vehicle is presented as an example of a movable body. Examples of other movable bodies include ships and aircrafts. FIG. 1 illustrates a driver driving a vehicle. Indicator lights on a vehicle include indications intended to notify the driver about the state of the vehicle or situations surrounding the vehicle, such as warning lights, indication indicating the status of the vehicle, etc. Such warning lights are displayed, for example, on the instrument panel of the vehicle (meter 17, see FIG. 2 below). In other words, the instrument panel is an example of a display device for displaying an indicator light. In the present embodiment, information notification system 10 includes mainly steering wheel 20 used to steer the vehicle. Steering wheel 20 is easy to provide a visual stimulus because it is located in front of the driver, and it is easy to provide vibration, i.e., a tactile stimulus, to the driver's hands because steering wheel 20 is a part where the driver grips.

Figure 2:
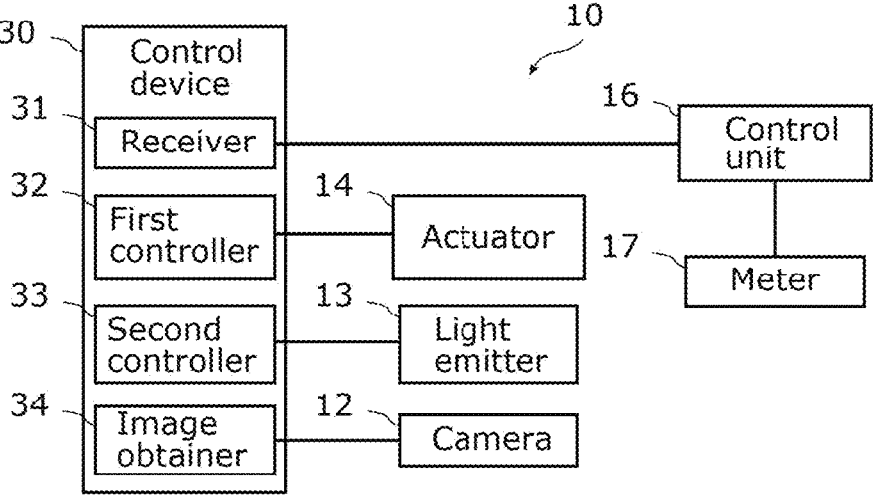
FIG. 2 is a block diagram illustrating part of the functional configuration of the movable body including the information notification system according to the embodiment.
Figure 3:
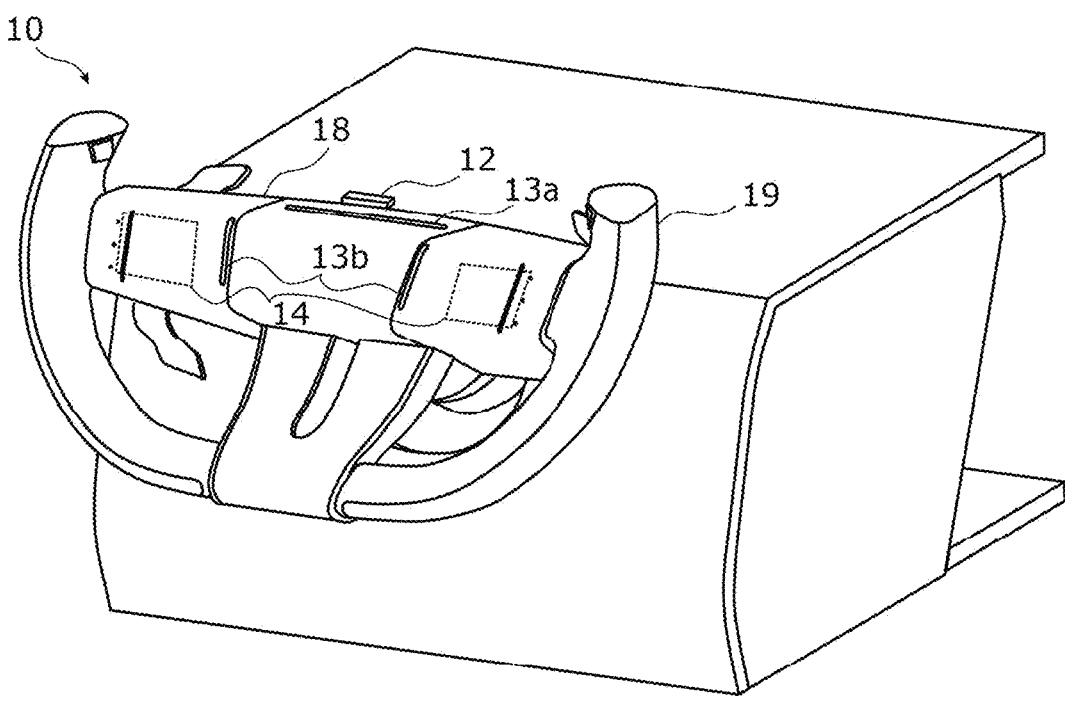
FIG. 3 is a perspective view illustrating in the vicinity of the steering wheel of the movable body including the information notification system according to the embodiment.

In the following, information notification system 10 and a configuration of part related to information notification system 10 will be described with reference to FIGS. 2 and 3. FIG. 2 is a block diagram illustrating part of the functional configuration of the movable body including the information notification system according to the embodiment. FIG. 3 is a perspective view illustrating in the vicinity of the steering wheel of the movable body including the information notification system according to the embodiment. FIG. 2 also illustrates control unit 16 and meter 17, in addition to information notification system 10. Moreover, FIG. 3 illustrates only the configuration provided in steering wheel 20 among the configuration of information notification system 10. Note that the dashed lines in FIG. 3 show an internal configuration that can be seen when the external structure is transparent.

As illustrated in FIG. 2, information notification system 10 includes control device 30, actuator 14, light emitter 13, and camera 12. Control device 30 is connected to each of control unit 16, actuator 14, light emitter 13, and camera 12. Control device 30 includes receiver 31, first controller 32, second controller 33, and image obtainer 34.

Receiver 31 is communicably connected to control unit 16. Control unit 16 is a so-called electronic control unit (ECU) that controls the information displayed on meter 17. Control unit 16 outputs an image to be displayed on meter 17 and displays the image in the display of meter 17. Meter 17 is an electronic instrument panel and functions as an instrument panel by receiving an image indicating instrument information from control unit 16 and displaying the image. The image displayed on meter 17 is seen by the driver.

Here, control unit 16 can include an indicator light in the image displayed by meter 17. The image including the indicator light is displayed in the same manner as above by meter 17. At this time, control unit 16 generates display information including displaying of the indicator light and the contents of the indicator light. Control unit 16 transmits the generated display information to receiver 31.

Receiver 31 receives the display information transmitted from control unit 16. The reception of the display information triggers output of control signals for controlling first controller 32 and second controller 33 to first controller 32 and second controller 33. Note that the combination of control unit 16 and meter 17 is merely an example. In addition to meter 17, the indicator light can also be displayed in an in-vehicle device provided in the center console, etc., or in the side mirrors (rear vehicle approach indication, etc.). Therefore, receiver 31 may receive the display information including (i) displaying of the indicator light and (ii) the information related to the contents of the indicator light from another configuration instead of control unit 16.

Figure 4:
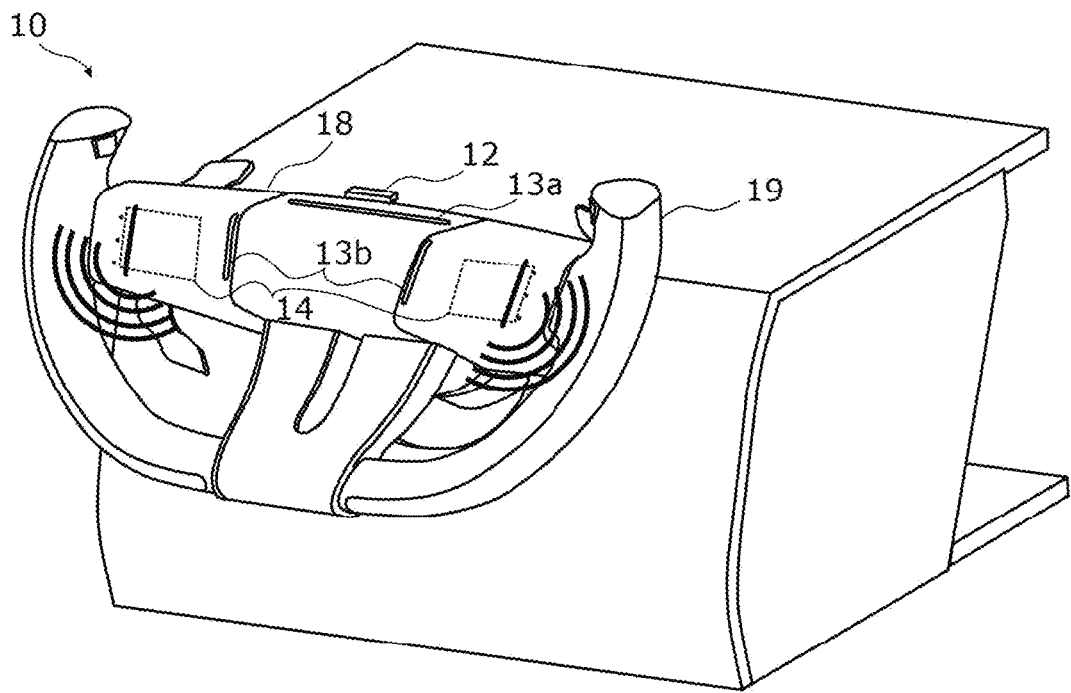
FIG. 4 is a diagram for illustrating a function of the actuator of the steering wheel of the movable body including the information notification system according to the embodiment.
Figure 5:
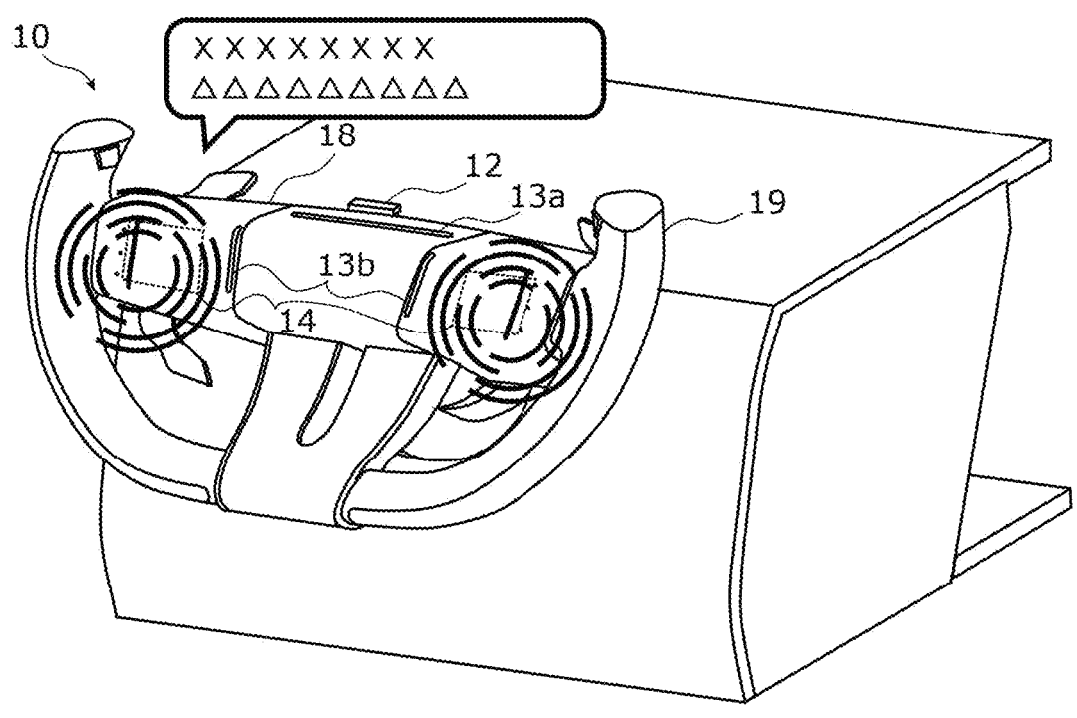
FIG. 5 is a diagram for illustrating a function of the actuator of the steering wheel of the movable body including the information notification system according to the embodiment.

First controller 32 is electrically connected to actuator 14. First controller 32 controls operation of actuator 14 using an electrical signal. Here, FIGS. 4 and 5 are diagrams for illustrating functions of the actuator of the steering wheel of the movable body including the information notification system according to the embodiment. Actuator 14 is a device that can vibrate steering wheel 20 as illustrated in FIG. 4 and can cause steering wheel 20 to output sound from steering wheel 20 as illustrated in FIG. 5 by changing the frequency range in which actuator 14 vibrates. How actuator 14 operates is determined by an electrical signal output by first controller 32.

As illustrated in FIG. 3, actuator 14 is provided inside steering wheel 20. In this example, although actuator 14 is provided inside support 18 that supports main body 19 of steering wheel 20, actuator 14 may be provided inside main body 19. Note that actuator 14 may be provided inside steering switches (not illustrated) provided to support 18. Actuator 14 provided inside support 18 can vibrate main body 19 through support 18 when actuator 14 vibrates. In addition, actuator 14 includes two or more vibrators, and among the vibrators, one or more vibrators are provided on one half and one or more vibrators are provided on the other half of support 18 in the extending direction (first direction) of support 18 that extends across main body 19. Note that actuator 14 may include two or more vibrators, and among the two or more vibrators, one or more vibrators are provided inside the right steering switch and one or more vibrators are provided to left steering switch. Each of these vibrators can vibrate independently of each other. As a result, the tactile stimulus provided to the driver can be biased in the first direction by vibrating one or more vibrators on one half or vibrating one or more vibrators on the other half of support 18 in the first direction. Which of the two or more vibrators vibrates is determined by the electrical signal output by first controller 32. The number of vibrators here is an example. Actuator 14 may include one vibrator on either one half or the other half of support 18, or one vibrator in the middle (center) between the one half and the other half of support 18. Actuator 14 dedicated to information notification system 10 may be provided, or actuator 14 included in a sound reproducible steering wheel may also serve as actuator 14 for information notification system 10.

Note that main body 19 of steering wheel 20 is a so-called steering rim, and support 18 of steering wheel 20 is a so-called steering spoke. Support 18 also has a function to transmit rotation of main body 19 to the steering shaft.

Second controller 33 is electrically connected to light emitter 13. Second controller 33 controls the light emission of light emitter 13 by an electrical signal. Light emitter 13 includes first light emitter 13a having a shape elongated in an extending direction of support 18 (a first direction) and configured to emit light from a plurality of points of first light emitter 13a arranged in the first direction, and second light emitter 13b having a shape elongated in a second direction that intersects with the first direction and configured to emit light from a plurality of points of second light emitter 13b arranged in the second direction. Moreover, second light emitter 13b is located on each of the one half and the other half of support 18. The numbers of first light emitters 13a and second light emitters 13b here are mere examples, and a plurality of first light emitters 13a may be provided on the one half and the other half of support 18. Moreover, second light emitter 13b may include one light emitter provided on the one half or the other half of support 18. Alternatively, second light emitter 13b may include one light emitter provided in the middle (center) between the one half and the other half of support 18. Moreover, one of first light emitter 13a or second light emitter 13b need not be provided.

Figure 6:
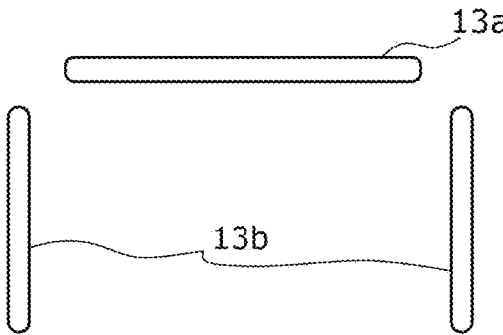
FIG. 6 is a diagram for illustrating a function of the light emitter of the steering wheel of the movable body including the information notification system according to the embodiment.

Here, FIGS. 6 through 11 are diagrams for illustrating functions of the light emitter of the steering wheel of the movable body including the information notification system according to the embodiment. In the following, light emitting modes of each of first light emitter 13a and second light emitters 13b will be described. Here, dot hatching indicates light emission of a light emitter, and white (without dot hatching) indicates that a light emitter is not emitting light. Moreover, only first light emitter 13a and second light emitters 13b in a plan view of steering wheel 20 are illustrated for ease of viewing. As illustrated in FIG. 6, when light emitter 13 is off, first light emitter 13a and second light emitters 13b are not emitting any light.

Figure 7:
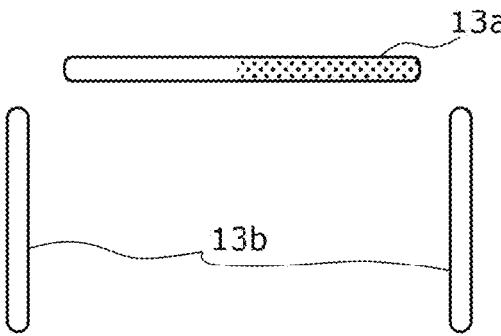
FIG. 7 is a diagram for illustrating a function of the light emitter of the steering wheel of the movable body including the information notification system according to the embodiment.
Figure 8:
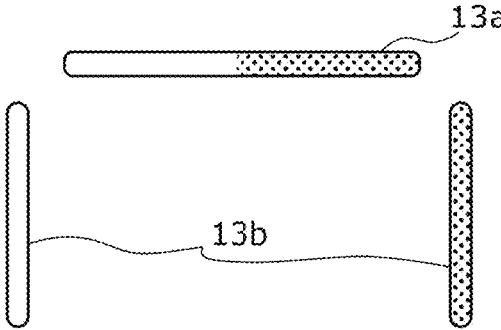
FIG. 8 is a diagram for illustrating a function of the light emitter of the steering wheel of the movable body including the information notification system according to the embodiment.

For example, if the indicator light is displayed on the right side of meter 17 or on the right side mirror instead of meter 17, it is possible to emit light from only the right side of first light emitter 13a, as illustrated in FIG. 7. Since the first direction corresponds to the right-and-left direction of the vehicle when steering wheel 20 is in the 12 o'clock position (neutral position), the illumination from one half or the other half of first light emitter 13a in the first direction can notify the driver of the area in which the indicator light is displayed. More precisely, the driver, knowing that the direction of the area in which the indicator light is displayed is indicated by the illumination of first light emitter 13a, can perceive the area in which the indicator light is displayed by the illumination as described above. In addition, as illustrated in FIG. 8, only the right side of first light emitter 13a and one of the two second light emitters 13b corresponding to the right side may be caused to emit light to indicate the area in which the indicator light is displayed.

Figure 9:
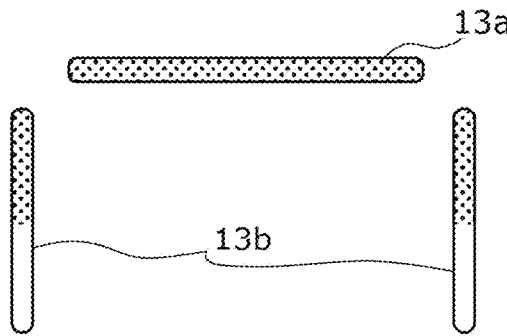
FIG. 9 is a diagram for illustrating a function of the light emitter of the steering wheel of the movable body including the information notification system according to the embodiment.

Moreover, for example, if the indicator light is displayed on meter 17 on the back side of steering wheel 20 (front side of the vehicle), the entire first light emitter 13a can emit light, and only the upper portions of second light emitters 13b can emit light, as illustrated in FIG. 9. Since the second direction corresponds to the front-and-rear direction of the vehicle when steering wheel 20 is in the 12 o'clock position, the illumination from one half or the other half of second light emitter 13b in the second direction can notify the driver of the area in which the indicator light is displayed.

So far, an example in which the points from which light is emitted in first light emitter 13a and second light emitter 13b are fixed has been described. For example, for light emitter 13, which can emit light from a plurality of points, by changing the points from which light is emitted in chronological order, light emitter 13 can emit light in a manner that simulates light movement. The light movement has an advantage that it is easier to see even in peripheral vision, and it is easier to notify the driver of the area in which the indicator light is displayed without moving the line of sight greatly.

Figure 10:
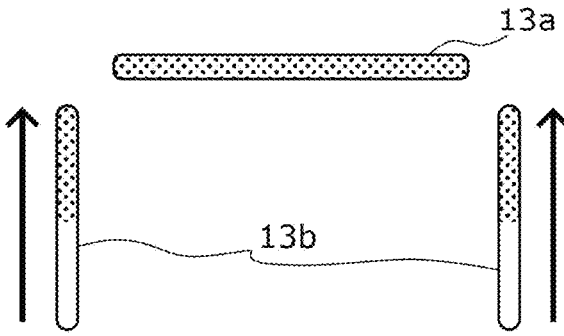
FIG. 10 is a diagram for illustrating a function of the light emitter of the steering wheel of the movable body including the information notification system according to the embodiment.
Figure 11:
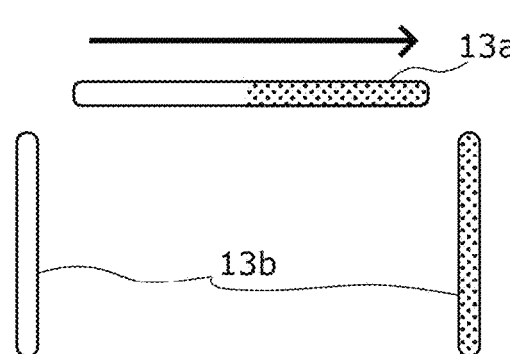
FIG. 11 is a diagram for illustrating a function of the light emitter of the steering wheel of the movable body including the information notification system according to the embodiment.

As indicated by the arrows in FIG. 10, the light movement may be performed as follows: The lighting position may be gradually moved from the lower end of second light emitter 13b toward the upper side and first light emitter 13a may be caused to emit light last. Alternatively, after second light emitter 13b on the left side is caused to emit light and turned off, the lighting position may be gradually moved from the left side toward the right side of first light emitter 13a as indicated by the arrow in FIG. 11, and second light emitter 13b on the right side may be caused to emit light last.

The light movement can be changed over time not only in terms of the direction but also speed. In other words, a speed of light movement is associated with a certain index and the speed of light movement corresponding to the index is determined, and by causing the light in a manner that simulates light movement at the determined speed, the driver can be notified of the corresponding index. As an index, the distance to the area in which the indicator light is displayed (for example, whether the indicator light is displayed on meter 17 or a side mirror) can be used. How light emitter 13 emits light, which has been described above, is determined by an electrical signal output by second controller 33.

By referring back to FIGS. 2 and 3, image obtainer 34 is communicably connected to camera 12. Image obtainer 34 obtains an image output by camera 12. The image obtained by image obtainer 34 is used to detect the line of sight of the driver. The detection of the line of sight here is performed with a resolution that is sufficient to identify whether the driver is looking at the meter. As a result, there is no need for expensive configuration for high-resolution detection of the line of sight, and it is advantageous in terms of cost. Note that any known method may be used to detect the line of sight from an image. Camera 12 is provided in the middle portion of support 18 of steering wheel 20 as illustrated in FIG. 3 and can capture an image of the face of the driver holding steering wheel 20. The captured image is output to image obtainer 34, and this output image is obtained by image obtainer 34.

[Operation]

Figure 12:
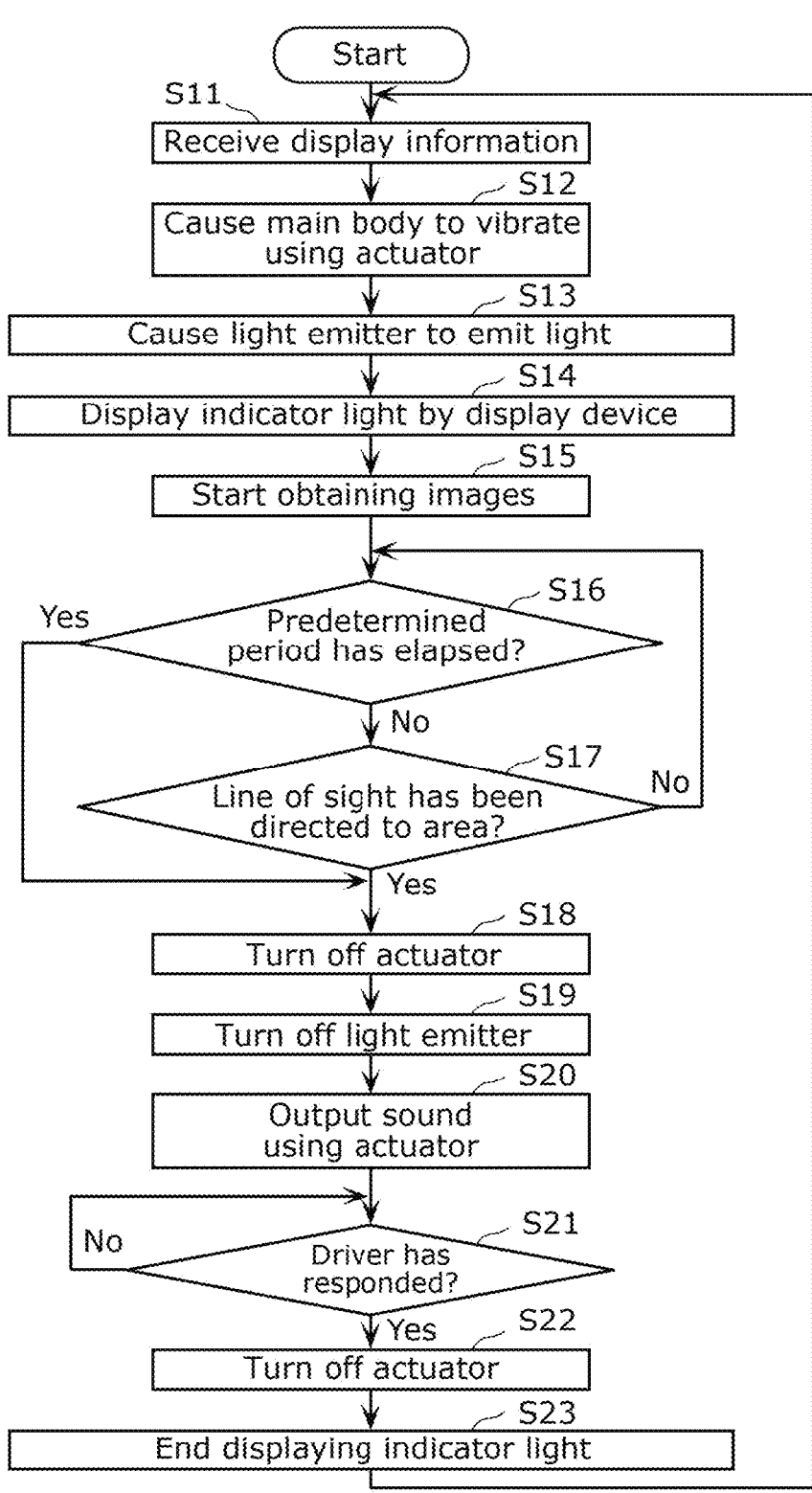
FIG. 12 is a flowchart illustrating an operational example of the movable body including the information notification system according to an embodiment.

Next, an example of operation of information notification system 10 having the above-described configuration will be described with reference to FIG. 12. FIG. 12 is a flowchart illustrating an operational example of the movable body including the information notification system according to the embodiment.

The operation of information notification system 10 starts when a vehicle is started. It is assumed that a situation has occurred where control unit 16 causes meter 17 to display an indicator light while the driver is driving the vehicle. Then, as illustrated in FIG. 12, the display information generated by control unit 16 is transmitted to receiver 31. Receiver 31 receives the transmitted display information (step S11). Step S11 is an example of a step of receiving. When receiver 31 receives the display information, first controller 32 outputs an electrical signal to cause support 18 of steering wheel 20 to vibrate. By controlling which vibrators of actuator 14 are used based on the received display information, first controller 32 can cause support 18 to vibrate to indicate a direction such as on one half or the other half in the first direction. Vibration of support 18 also causes main body 19 to vibrate. As a result, first controller 32 causes main body 19 of steering wheel 20 to vibrate (step S12). Step S12 is an example of a step of controlling actuator 14. Step S12 will be continued until actuator 14 is turned off.

Moreover, when receiver 31 receives the display information, second controller 33 outputs an electrical signal and causes light emitter 13 to emit light (illuminate) (step S13). Step S13 is an example of a step of controlling light emitter 13. Second controller 33 controls from which points of light emitter 13 the light is emitted based on the received display information, and can cause light emitter 13 to emit light to indicate a direction such as on one half or the other half of support 18 in the first direction and on one half or the other half of support 18 in the second direction. Step S13 is continuously performed until light emitter 13 is turned off.

On the other hand, an indicator light is displayed on the display device (meter 17) by the image output from control unit 16 (step S14). Camera 12 then starts to capture images of the driver. The captured images are sequentially output to image obtainer 34, and image obtainer 34 starts to obtain the images. Step S15 will also be performed continuously thereafter. Moreover, steps S12 to S15 described so far are performed substantially at the same time.

Next, control device 30 determines whether a predetermined period has elapsed (step S16). The predetermined period here is a period in which a tactile stimulus by vibration and a visual stimulus by emission of light are sufficiently perceptible and a sufficient period to move the line of sight, and may be set according to the reaction speed of the driver. The predetermined period may be set, for example, from a few seconds to a dozen seconds, for example, from 1 second to 10 seconds, and preferably from 3 seconds to 5 seconds. When it is determined that the predetermined period has not elapsed (No in step S16), whether the detected line of sight of the driver has been directed to the area in which the indicator light is displayed is determined based on the obtained image (step S17). When it is determined that the line of sight of the driver is not directed to the area in which the indicator is displayed (No in step S17), the processing returns to step S16 and the determination is repeated.

When it is determined that the predetermined period has elapsed (Yes in step S16), even though the line of sight has not been directed to the area, it is regarded that an enough period has elapsed for the driver to react. Therefore, the processing proceeds to outputting of sound (step S18 and subsequent steps). Alternatively, when it is determined that the line of sight of the driver is directed to the area in which the indicator light is displayed (Yes in step S17), it is assumed that the driver is now in a situation where the meaning of the indicator light can be understood by seeing the indicator light and hearing the sound, and therefore the processing proceeds to outputting of sound (step S18 and subsequent steps).

If the result is "Yes" in step S16 or step S17, first controller 32 turns off actuator 14 (step S18). Moreover, second controller 33 turns off light emitter 13 (step S19). Then, first controller 32 outputs sound using actuator 14 (step S20). Step S20 is an example of the step of controlling actuator 14.

Control device 30 determines whether the driver has responded to the sound output based in the indicator light, such as driving operation or operation of a switch by the driver (step S21). If the driver has not responded (No in step S21), step S21 is repeated until the driver respond to the sound. If the driver has responded (Yes in step S21), first controller 32 turns off actuator 14 (step S22). In addition, since the display of the indicator light is no longer necessary, control unit 16 generates and outputs an image that does not include the indicator light, and causes the display device (meter 17) to display the image. Accordingly, displaying the indicator light is ended (step S23).

Variation 1

The following describes variations according to the embodiment. The variations described below focus on the differences from the above embodiment, and points similar to the above embodiment will be omitted. The present variation is different in that an image is not obtained by camera 12 and the determination based on detection and the direction of the line of sight of a driver is not performed. In other words, in the present variation, step S15 is not performed and when the result is No in step S16, determination in step S16 is repeated again without performing step S17. With this, information notification system 10 can be implemented without camera 12 and image obtainer 34.

Variation 2

In the present variation, the configuration and the operation are the same as the embodiment, but the present variation is different in that it is assumed that operation of a driver for a tactile stimulus caused by vibration and a visual stimulus caused by light emission is required. Specifically, in the present variation, cases where the driver needs to operate steering wheel 20 of the vehicle due to a tactile stimulus caused by vibration and a visual stimulus caused by light emission are assumed. For example, (1) when an indicator light indicating that the vehicle is approaching from the rear side is displayed, (2) when an indicator light indicating lane departure is displayed, and (3) when an indicator light indicating that the vehicle is reversing off the recommended path is displayed. In these cases, immediate operation of steering wheel 20 is required rather than waiting for the line of sight to move or waiting for a predetermined period of time to elapse to provide audio guidance.

The indicator lights in the case in (1) will be described. For example, when receiver 31 receives the display information, steps S12 to S13 are performed to provide a driver with a tactile stimulus by vibration and a visual stimulus by light emission. In this case, the rotation direction and the rotation speed of steering wheel 20, which is considered to be able to avoid vehicle approach from the rear side, are calculated and reflected in electrical signals of first controller 32 and second controller 33. As a result, actuator 14 vibrates one or more vibrators arranged on a side corresponding to the rotation direction of steering wheel 20 which is considered to be able to avoid vehicle approaching from the rear side in the first direction, and light emitter 13 emits light in a manner that simulates light movement in the direction and the speed corresponding to the rotation direction and the rotation speed of steering wheel 20, which are considered to be able to avoid vehicle approaching from the rear side in the first direction. The driver may be able to operate steering wheel 20 to avoid the vehicle approaching from the rear side by operating steering wheel 20 in accordance with the tactile stimulus and the visual stimulus without seeing the indicator light.

Similarly, in the case of the indicator light in (2), when receiver 31 receives the display information, steps S12 and S13 are performed to provide the driver with a tactile stimulus by vibration and a visual stimulus by light emission. In this case, the rotation direction and the rotation speed of steering wheel 20, which are considered to be able to return the deviating vehicle to its original lane, are calculated and reflected in the electrical signals of first controller 32 and second controller 33. This may allow the driver to return the deviating vehicle to its original lane by operating steering wheel 20 in accordance with the tactile stimulus and the visual stimulus without seeing the indicator light.

Similarly, in the case of the indicator light in (3), when receiver 31 receives the display information, steps S12 and S13 are performed to provide the driver with a tactile stimulus by vibration and a visual stimulus by light emission. In this case, the rotation direction and the rotation speed of steering wheel 20, which are considered to be able to make the reversing direction to follow the recommended path, are calculated and reflected in the electrical signals of first controller 32 and second controller 33. This may allow the driver to reverse the vehicle along the recommended path by operating steering wheel 20 in accordance with the tactile stimulus and the visual stimulus without seeing the indicator light.

Other Embodiments

The foregoing has described an exemplary embodiment, but the present disclosure is not limited to the foregoing embodiment.

For example, in the above embodiments, processing performed by a particular processing unit may be performed by a different processing unit. The order of the plurality of processes may be changed, or the plurality of processes may be executed in parallel.

In addition, the information notification system according to the present disclosure may be implemented by a plurality of devices each including one or more of the structural elements, or by a single device including all of the structural elements. In addition, one or more of the functions of the structural elements may be implemented as the functions of other structural elements, and each function may be distributed to the structural elements in any manner. Any form that includes a structure that substantially provides all the functions that enable the information notification system according to the present disclosure is included in the present disclosure.

Moreover, in the above embodiment, each structural element may be configured as dedicated hardware or implemented by executing a software program suitable for the structural elements. Each structural element may be implemented as a result of a program execution unit of a central processing unit (CPU) or processor or the like reading and executing a software program recorded on a recording medium such as a hard disk or semiconductor memory.

Moreover, each structural element may be implemented by hardware. For example, each structural element may be a circuit (or integrated circuit). These circuits may form a single circuit as a whole, or may be separate circuits. Moreover, each of these circuits may be a general-purpose circuit or a dedicated circuit.

Moreover, the general or specific aspects of the present disclosure may be implemented using a system, a method, an integrated circuit, a computer program, or a computer-readable recording medium such as a CD-ROM. Moreover, the general or specific aspects of the present disclosure may be implemented using any combination of systems, methods, integrated circuits, computer programs, and computer-readable recording media.

Moreover, the present disclosure may be implemented as a control method executed by the information notification system. The present disclosure may be implemented as a program for causing a computer to execute such a control method, or a non-transitory computer-readable recording medium having recorded thereon such a program.

In addition, embodiments obtained by applying various modifications, which occur to those skilled in the art, to the aforementioned one or more embodiments, and embodiments obtained by combining the structural elements and functions in the aforementioned one or more embodiments in any manner within a scope not departing from the teaching of the present disclosure are also included in the present disclosure.

While various embodiments have been described herein above, it is to be appreciated that various changes in form and detail may be made without departing from the spirit and scope of the present disclosure as presently or hereafter claimed.

Further Information about Technical Background to this Application

The disclosure of the following patent application including specification, drawings, and claims are incorporated herein by reference in their entirety: Japanese Patent Application No. 2023-206331 filed on Dec. 6, 2023.

INDUSTRIAL APPLICABILITY

The present disclosure is useful, for example, as an information notification system provided in a movable body such as a vehicle.

The invention claimed is:

1. An information notification system comprising:
an actuator that vibrates a main body of a steering wheel for operating a movable body and is configured to output sound through vibration;
a light emitter provided to the steering wheel and configured to emit light; and
a control device that is electrically connected to the actuator and the light emitter, controls the actuator and the light emitter, and receives display information related to an indicator light displayed to an operator of the movable body, wherein
the light emitter includes a first light emitter having a shape elongated in a first direction and configured to emit light from a plurality of points of the first light emitter arranged in the first direction, and
when receiving the display information, the control device:
causes the main body to vibrate using the actuator and the first light emitter to emit light in a manner that simulates light movement in the first direction toward an area in which the indicator light is displayed; and subsequently outputs, using the actuator, sound related to the display information received.

2. The information notification system according to claim 1, further comprising:

a camera that captures an image of the operator and outputs the image captured to the control device, wherein when receiving the display information, the control device causes the main body to vibrate using the actuator and the light emitter to emit light, and subsequently, when determining that a line of sight of the operator in the image outputted is directed to an area in which the indicator light is displayed, the control device outputs, using the actuator, the sound related to the display information received.

3. The information notification system according to claim 1, wherein when receiving the display information, the control device causes the main body to vibrate using the actuator and the light emitter to emit light, and subsequently, when determining that a predetermined period has elapsed, the control device outputs, using the actuator, the sound related to the display information received.

4. The information notification system according to claim 1, wherein the light emitter includes a second light emitter having a shape elongated in a second direction that intersects with the first direction and configured to emit light from a plurality of points of the second light emitter arranged in the second direction, and the control device is configured to cause the second light emitter to emit light in a manner that simulates light movement in the second direction toward the area in which the indicator light is displayed.

5. The information notification system according to claim 1, wherein the control device is configured to cause the first light emitter to emit light in a manner that simulates light movement in a rotation direction of the steering wheel recommended based on the display information.

6. The information notification system according to claim 1, wherein the control device is configured to:

determine a speed of the light movement; and cause the light emitter to emit light in the manner that simulates the light movement at the speed determined.

7. The information notification system according to claim 1, wherein the actuator is provided inside a support that supports the main body.

8. The information notification system according to claim 1, wherein the actuator includes a plurality of vibrators, and among the plurality of vibrators, one or more vibrators are provided on one half of the steering wheel in a first direction and one or more vibrators are provided on an other half of the steering wheel in the first direction, and the control device is configured to cause the main body to vibrate using a vibrator, among the plurality of vibrators, that is closer to an area in which the indicator light has been displayed in the first direction.

9. The information notification system according to claim 1, wherein the actuator includes a plurality of vibrators, and among the plurality of vibrators, one or more vibrators are provided on one half of the steering wheel in a first direction and one or more vibrators are provided on an other half of the steering wheel in the first direction, and the control device is configured to cause the main body to vibrate using a vibrator, among the plurality of vibrators, located closer to a leading end corresponding to a rotation direction of the steering wheel recommended based on the display information.

10. An information notification system comprising:

an actuator that vibrates a main body of a steering wheel for operating a movable body and is configured to output sound through vibration;

a light emitter provided to the steering wheel and configured to emit light; and a control device that is electrically connected to the actuator and the light emitter, controls the actuator and the light emitter, and receives display information related to an indicator light displayed to an operator of the movable body, wherein the light emitter includes a first light emitter having a shape elongated in a first direction and configured to emit light from a plurality of points of the first light emitter arranged in the first direction, and when receiving the display information, the control device:

causes the main body to vibrate using the actuator and the first light emitter to emit light in a manner that simulates light movement in a rotation direction of the steering wheel recommended based on the display information; and subsequently outputs, using the actuator, sound related to the display information received.

11. An information notification system comprising:

an actuator that vibrates a main body of a steering wheel for operating a movable body and is configured to output sound through vibration;

a light emitter provided to the steering wheel and configured to emit light; and a control device that is electrically connected to the actuator and the light emitter, controls the actuator and the light emitter, and receives display information related to an indicator light displayed to an operator of the movable body, wherein the actuator includes a plurality of vibrators, and among the plurality of vibrators, one or more vibrators are provided on one half of the steering wheel in a first direction and one or more vibrators are provided on an other half of the steering wheel in the first direction, and when receiving the display information, the control device:

causes the main body to vibrate using a vibrator, among the plurality of vibrators, that is closer to an area in which the indicator light has been displayed in the first direction and the light emitter to emit light; and subsequently outputs, using the actuator, sound related to the display information received.

* * * * *